United States Patent
Hoogerbrugge

(10) Patent No.: US 8,539,211 B2
(45) Date of Patent: Sep. 17, 2013

(54) ALLOCATING REGISTERS FOR LOOP VARIABLES IN A MULTI-THREADED PROCESSOR

(75) Inventor: Jan Hoogerbrugge, Helmond (NL)

(73) Assignee: Nytell Software LLC, Wilmington, DE (US)

( * ) Notice: Subject to any disclaimer, the term of this patent is extended or adjusted under 35 U.S.C. 154(b) by 589 days.

(21) Appl. No.: 11/814,801

(22) PCT Filed: Jan. 17, 2006

(86) PCT No.: PCT/IB2006/050167
§ 371 (c)(1),
(2), (4) Date: Mar. 25, 2008

(87) PCT Pub. No.: WO2006/079940
PCT Pub. Date: Aug. 3, 2006

(65) Prior Publication Data
US 2008/0195851 A1    Aug. 14, 2008

(30) Foreign Application Priority Data
Jan. 25, 2005  (EP) .................................. 05100455

(51) Int. Cl.
*G06F 9/50* (2006.01)
(52) U.S. Cl.
USPC .......................................... 712/235; 712/241
(58) Field of Classification Search
USPC ........................................................ 712/241
See application file for complete search history.

(56) References Cited

U.S. PATENT DOCUMENTS

| 5,854,922 | A | * | 12/1998 | Gravenstein et al. | ......... 712/245 |
| 6,092,175 | A | * | 7/2000 | Levy et al. | ....................... 712/23 |
| 6,272,676 | B1 | | 8/2001 | Haghighat et al. | |
| 6,351,808 | B1 | | 2/2002 | Joy et al. | |
| 7,610,473 | B2 | * | 10/2009 | Kissell | ........................... 712/235 |
| 2001/0021972 | A1 | * | 9/2001 | Topham | ........................ 712/217 |

FOREIGN PATENT DOCUMENTS

EP    1164471  A2    12/2001

OTHER PUBLICATIONS

Chris Jesshope, "Implementing an efficient vector instruction set in a chip multi-processor using micro-threaded pipelines", 2001.*
Hou, Ting-Wei; et al "Distributed and Parallel Execution of Java Programs on a DSM System" Cluster Computing and the Grid, 2001. Proceedings. First IEEE/ACM International Symposium on May 15-18, 2001. May 15, 2001, pp. 555-559.
Jesshope, C; et al "Micro-Threading: A New Approach to Future Risc" Computer Architecture Conference, 2000. ACAC 2000. 5th Australasian Canberra, ACT, Australia, Jan. 31, 2000, pp. 34-41.

* cited by examiner

*Primary Examiner* — Eric Coleman
(74) *Attorney, Agent, or Firm* — McAndrews, Held & Malloy, Ltd.

(57) ABSTRACT

A multi-threaded processor comprises a processing unit (PU) for concurrently processing multiple threads. A register file means (RF) is provided having a plurality of registers, wherein a first register (LI) is used for storing loop invariant values and N second registers (LVI-LVN) are each used for storing loop variant values. Furthermore N program counters (PCI-PCN) are provided each being associated to one of the multiple threads, wherein N being the number of threads being processed.

21 Claims, 1 Drawing Sheet

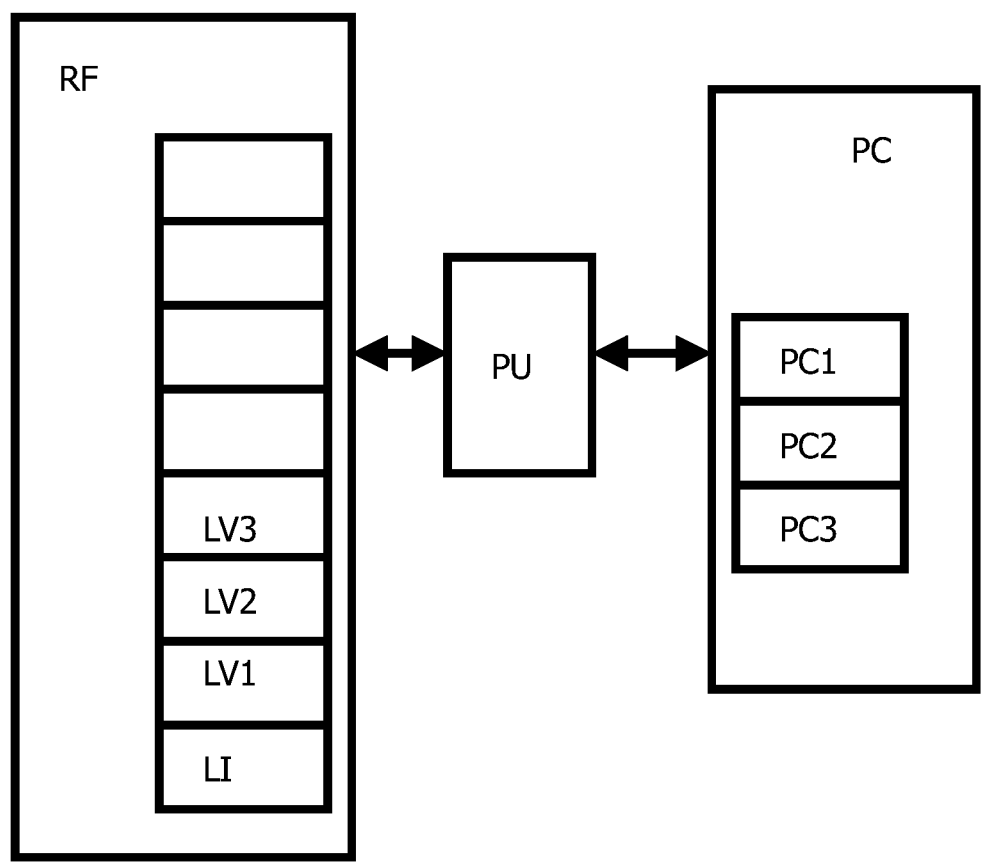

ALLOCATING REGISTERS FOR LOOP VARIABLES IN A MULTI-THREADED PROCESSOR

The present invention relates to a multi-threaded processor having a processing unit for concurrently processing multiple tasks as well as a method for compiling parallel loops.

A processor typically executes instructions from a thread and comprises a register file for data that will be referenced by the instruction as well as a program counter for those addresses of the currently executed instructions, i.e. an instruction address register. In order to reduce the time during which the processor does not execute the instructions because it is waiting for data or further instructions from the memory, multiple threads are executed concurrently on the processor. If the execution of one thread is stalled, it is switched to the next thread. Such a switching is also referred to as context switching. To enable an efficient and fast switching the context of the multiple threads must be kept in the processor. Therefore, a multi-threaded processor must contain a register file and a program counter for each thread. In order to enhance the performance of a multi-threaded processor additional resources are required to store the multiple contexts. However, the additional resources increase the additional costs in terms of the required area on the die and in terms of the higher design complexity.

U.S. Pat. No. 6,351,808B1 relates a multi-threaded processor with a replicated register file structure.

U.S. Pat. No. 6,092,175 disclose a multi-threaded processor supporting multiple contexts or threads. In order to reduce the number of registers some of the register files are shared between the threads and allocated to a thread if required.

It is therefore an object of the invention to provide a multi-threaded processor with reduced hardware costs as well a method for compiling parallel loops for a multi-threaded processor.

Therefore, a multi-threaded processor comprises a processing unit for concurrently processing multiple threads. A register file means is provided having a plurality of registers, wherein at least one first register is used for storing loop invariant values and N second registers or N further sets of registers are each used for storing loop variant values. Furthermore N program counters are provided each being associated to one of the multiple threads, wherein N being the number of threads being processed.

Hence, as merely the program counter is duplicated and only part of the register file, the hardware complexity and the hardware cost can be reduced for multi-threaded processors.

According to an aspect of the invention each of the N second registers is associated to one of the multiple threads, and the at least one first register is shared between the multiple threads. Therefore, by sharing the first register between the multiple threads there is no need to provide such a first register for each thread. This will lead to an improved utilization of the registers in the register file. Instead of allocating a first register for storing loop invariant values for each thread, only one first register is allocated for all threads, i.e. shared between the threads.

According to a further aspect of the invention the partitioning or allocating of the plurality of registers in the register file means into first and second registers is performed per loop. As the requirements may vary for each loop, the partitioning or allocating of registers for loop invariant and loop variant values can be performed for each loop.

The invention also relates to a method for compiling parallel loops within a set of instructions. Loop invariant and loop variant values in loops within a set of instructions for a multi-threaded processor having a register file are detected. A plurality of registers of the register file are partitioned or allocated into at least one first register for storing the loop invariant values and N second registers or N sets of registers each for storing loop variant values, wherein N being the number of threads being processed.

The invention is based on the idea to compile loops into multiple threads. Merely the program counter is duplicated without duplicating all the register files accordingly. While according to the prior art the register files require N loop invariant registers and N loop variant registers, the present invention only requires register for loop invariant values (shared between threads) and N register for loop variant values each associated or dedicated to the N threads. The existing registers in a register file are partitioned or allocated into registers for loop variant registers and registers for loop invariant registers, i.e. the registers are partitioned into disjoint subsets. Multi-threading is applied to parallel loops by translating a parallel loop into two or more loops.

These and other aspects of the invention are apparent from and will be elucidated with reference to the embodiments described hereinafter.

FIG. 1 shows the basic architecture of a multi-threaded processor according to a first embodiment.

FIG. 1 shows a basic architecture of a multi-threaded processor according to a first embodiment. The processor comprises a processing unit PU that is capable for processing N threads concurrently. According to the embodiment of FIG. 1 three threads are processed, i.e. N=3. Therefore, a program counter PC is implemented which comprises a program counter unit for every thread, i.e. a first, second and third program counter unit PC1, PC2, PC3. Furthermore, a register file RF is provided with a plurality of registers. Here, merely 8 registers are depicted. From the plurality of registers of the register file RF a number of register sets LV1-LV3 are partitioned or allocated for loop variant values for each thread, i.e. the registers LV1-LV3 for loop variant values are duplicated according to the number of threads such that one register set LV1-LV3 for a loop variant is associated to each of the threads. In other words the partitioning of the registers in the register file is preformed to allocate N (one for each thread) registers for the loop variant values. The register file RF further comprises a register set LI for loop invariant values (one register is allocated for the loop invariant values and shared between the threads) such that the register file RF comprises a register LI for loop invariant values and 3 (N) register set LV for loop variant values. 4 of the registers are not used. It should be noted that the value of N is merely for illustrating and not limiting the embodiment.

As an example, the register file RF may comprise 32 registers. For one specific loop, 10 of the 32 registers are allocated for loop invariant values and 3×5 registers (3 sets of 5 registers) are allocated for loop variant values while seven registers are not used. In a further loop, four registers may be allocated for loop invariant values, 3×8 registers are allocated for loop variant values while four registers are not used. In other words, the existing registers can be allocated for loop invariant values and loop variant values for every loop to be performed. In some cases not all of the 32 registers in the register file RF will be used. It should be noted that the registers allocated to store loop invariant values are shared between the multiple threads, while those registers allocated to store loop variant values are associated exclusively or dedicated to one of the multiple threads at least for the duration of a loop. It should be furthermore noted that the register file may comprise a different number of registers.

As only the allocation of the registers LV1-LV3 for the loop invariant values are duplicated, the applications which may be processed based on the multiple threads are limited. As an example the multi-threading is applied to the processing of parallel loops as the requirements for the register file RF is less strict. According to this embodiment a parallel loop is translated into two loops.

A parallel loop may be implemented by the following code:

```
       For (i = 0 ; i < n; i++)
           S;
   and is translated into the following code:
       for k L      /*create a second thread, initial pc=L    */
       for (i = 0 ; i < n/2; i++)
           S;
       Wait         /* wait on termination of second thread    */
       ......
   L:  for (i = n/2 ; i < n; i++)
           S;
       Exit         /* stop thread */
```

The parallel loop is translated into two loops, namely one loop from 0 to <n/2 and one loop from n/2 to <n. These two loops are then processed concurrently as two threads. The data values in the loops may be loop variant, i.e. changing during the processing in the loop, or loop invariant, i.e. not changing during the loops. Examples of loop invariant values are base pointer to an array. The register LI or the set of registers LI are used to allocate all loop invariant values and the register LV or the set of registers LV is used to allocate all loop variant values. Therefore, to implement the above code one register LI and 2 register LV are required as two threads are present.

According to a second embodiment a SAXPY loop type is considered for multiplying a Scalar variable A with a vector X and adds it to a vector Y, i.e. S, A, X, P, Y. The following loop is considered.:

For (i=0; i<1000; i++)

a[i]=b[i]+s*c[i];

A corresponding assembly code could be implemented as follows:

```
       loadi #a -> r10
       loadi #b -> r11
       loadi #c -> r12
       loadi #s -> r13
       loadi #0 -> r14
   L1: loadi r11, r14 -> r15       /* load b[i] */
       loadi r12, r14 -> r16       /* load c[i] */
       mult r16, r13 -> r16        /* compute s*c[i] */
       add r16, r15 -> r16         /* add b[i] */
       store r10, r14 <- r16       /* store result in a[i] */
       add #1 r14 -> r14
       bless r14, #1000, L1
```

In the above loop the registers LI={r10, r11, r12 and r13} comprise loop invariant values as r10 to r12 contain the base addresses of arrays a, b and c. The register r13 is used to store the scalar value s. As all these values are constant during the execution of the loop they constitute loop invariant values. The registers r14 to r16 contain loop variant values as the values change during the execution of the loop.

The above loop can be translated according to the second embodiment into the following code, where the first thread utilizes registers LV1={r14–r16} for variant values and the second thread utilizes the registers LV2={r24-r26} for variant values:

```
       loadi #a -> r10
       loadi #b -> r11
       loadi #c -> r12
       loadi #s -> r13
       loadi #0 -> r14
       fork L2                     /* start second thread */
   L1: loadi r11, r14 -> r15       /* load b[i] */
       loadi r12, r14 -> r16       /* load c[i] */
       mult r16, r13 -> r16        /* compute s*c[i] */
       add r16, r15 -> r16         /* add b[i] */
       store r10, r14 <- r16       /* store result in a[i] */
       add#1 r14 -> r14
       bless r14, #500, L1         /* loop until 500 */
       wait
       ...
   L2: loadi #500 -> r24           /* start at i=500 */
   L3: loadi r11, r24 -> r25       /* load b[i] */
       loadi r12, r24 -> r26       /* load c[i] */
       mult r26, r13 -> r26        /* compute s*c[i] */
       add r26, r25 -> r26         /* add b[i] */
       store r10, r24 <- r26       /* store result in a[i] */
       add #1 r24 -> r24
       bless r24, #500, L1         /* loop until 1000 */
       wait
       exit                        /* stop second thread*/
```

As the two threads implementing the first and second loop (loop from 0 to 499, and loop from 500 to 1000) are executed concurrently by the multi-threaded processor, one of the threads can still be processes if the other is stalled. Thereby the execution time is reduced and the utilization of the processor is improved.

Multi-threading is applied to parallel loops by translating a parallel loop into two or more loops. Loop variant and loop invariant values are determined. The parallel loop is divided or translated into a plurality of loops. From the registers in the register file a number of registers corresponding to the number of threads is allocated or partitioned for loop invariant values such that each thread will be associated to one register to store its variant values. Furthermore, from the registers in the register file at least one will be allocated for storing the loop invariant values and will be shared between the threads.

It should be noted that the above-mentioned embodiments illustrate rather than limit the invention, and that those skilled in the art will be able to design many alternative embodiments without departing from the scope of the appended claims. In the claims, any reference signs placed between parenthesis shall not be construed as limiting the claim. The word "comprising" does not exclude the presence of elements or steps other than those listed in a claim. The word "a" or "an" preceding an element does not exclude the presence of a plurality of such elements. In the device claim in numerating several means, several of these means can be embodied by one and the same item of hardware. The mere fact that certain measures are resided in mutually different dependent claims does not indicate that a combination of these measures cannot be used to advantage.

Furthermore, any reference signs in the claims shall not be constitute as limiting the scope of the claims.

The invention claimed is:

1. A method, comprising:

identifying one or more loop invariant values and one or more loop variant values of a loop to be executed by a multi-threaded processor having a register file shared by a plurality of threads, wherein the one or more loop invariant values are to be accessed by the multi-threaded processor within the loop;

allocating a first register set from the register file to provide the plurality of threads with shared access to the one or more loop invariant values of the loop; and allocating a plurality of second register sets from the register file to the plurality of threads, wherein ones of the plurality of second register sets are configured to provide a different thread of the plurality of threads with non-shared access to the one or more loop variant values of the loop.

2. The method of claim 1, wherein:
said identifying comprises determining a quantity of loop invariant values for the loop; and
said allocating a first register set comprises assigning a quantity of registers to the first register set equal to the quantity of loop invariant values for the loop.

3. The method of claim 1, wherein:
said identifying comprises determining the loop has a single loop invariant value; and
said allocating a first register set comprises assigning a single register of the register file to the first register set.

4. The method of claim 1, wherein:
said identifying comprises determining the loop has a plurality of the loop invariant values; and
said allocating a first register set comprises assigning a plurality of registers of the register file to the first register set.

5. The method of claim 1, wherein:
said identifying comprises determining a quantity of loop variant values for the loop; and
said allocating a plurality of second register sets comprises assigning to each second register set a quantity of registers equal to the quantity of loop variant values for the loop.

6. The method of claim 1, wherein:
said identifying comprises determining the loop has a single loop variant value; and
said allocating a plurality of second register sets comprises assigning a separate, single register of the register file to each second register set.

7. The method of claim 1, wherein:
said identifying comprises determining the loop has a plurality of loop variant values; and
said allocating a plurality of second register sets comprises assigning a separate, plurality of registers of the register file to each second register set.

8. A multi-threaded processor, comprising:
a processing unit configured to execute a plurality of threads;
a program counter configured to store a separate address for ones of the plurality of threads; and
a register file comprising a plurality of registers, wherein the register file comprises a first register set and a plurality of second register sets, wherein the register file is configured to provide the plurality of threads with shared access to one or more loop invariant values of a loop via the first register set, and to provide threads included in the plurality of threads with non-shared access to one or more loop variant values of the loop via a separate second register set associated with the thread included in the plurality of threads;
wherein the one or more loop invariant values are to be accessed by the plurality of threads within the loop.

9. The multi-threaded processor of claim 8, wherein the register files is further configured to assign a quantity of registers to the first register set equal to a quantity of loop invariant values for the loop.

10. The multi-threaded processor of claim 8, wherein the register file is further configured to assign a single register of the register file to the first register set.

11. The multi-threaded processor of claim 8, wherein the register file is further configured to assign a plurality of registers of the register file to the first register set.

12. The multi-threaded processor of claim 8, wherein the register file is further configured to assign to each second register set a quantity of registers equal to a quantity of loop variant values for the loop.

13. The multi-threaded processor of claim 8, wherein the register file is further configured to assign a separate, single register of the register file to each second register set.

14. The multi-threaded processor of claim 8, wherein the register file is further configured to assign a separate, plurality of registers of the register file to each second register set.

15. A method, comprising:
reading, with a computing device, a first set of instructions that defines a loop for a multi-threaded processor having a register file shared by a plurality of threads;
identifying one or more loop invariant values and one or more loop variant values of the loop, wherein the one or more loop invariant values are to be accessed within the loop; and
generating, with the computing device, a second set of instructions, that in response to being executed by the multi-threaded processor, cause the multi-threaded processor to allocate a first register set and a plurality of second registers sets from the register file to the plurality of threads, store one or more loop invariant values of the loop in the first register set, and store one or more loop variant values of the loop in the plurality of second register sets;
wherein the second set of instructions further configures the first register set to provide the plurality of threads with shared access to the one or more loop invariant values of the loop, and further configures ones of the second register set to provide a separate thread of the plurality of threads with non-shared access to the one or more loop variant values of the loop.

16. The method of claim 15, wherein said generating a second set of instructions further comprises generating the second set of instructions such that the second set of instructions further cause the multi-threaded processor to assign a quantity of registers to the first register set equal to a quantity of loop invariant values for the loop.

17. The method of claim 15, wherein said generating a second set of instructions further comprises generating the second set of instructions such that the second set of instructions further cause the multi-threaded processor to assign a single register of the register file to the first register set.

18. The method of claim 15, wherein said generating a second set of instructions further comprises generating the second set of instructions such that the second set of instructions further cause the multi-threaded processor to assign a plurality of registers of the register file to the first register set.

19. The method of claim 15, wherein said generating a second set of instructions further comprises generating the second set of instructions such that the second set of instructions further cause the multi-threaded processor to assign to each second register set a quantity of registers equal to a quantity of loop variant values for the loop.

20. The method of claim 15, wherein said generating a second set of instructions further comprises generating the second set of instructions such that the second set of instructions further cause the multi-threaded processor to assign a separate, single register of the register file to each second register set.

21. The method of claim 15, wherein said generating a second set of instructions further comprises generating the second set of instructions such that the second set of instructions further cause the multi-threaded processor to assign a separate, plurality of registers of the register file to each second register set.

* * * * *

UNITED STATES PATENT AND TRADEMARK OFFICE
CERTIFICATE OF CORRECTION

PATENT NO.         : 8,539,211 B2
APPLICATION NO.    : 11/814801
DATED              : September 17, 2013
INVENTOR(S)        : Hoogerbrugge It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 954 days.

Signed and Sealed this
Twenty-fourth Day of February, 2015

Michelle K. Lee
*Deputy Director of the United States Patent and Trademark Office*